Sept. 9, 1924.  
A. A. MENDENHALL  
1,508,231  
SHOCK ABSORBING WHEEL FOR VEHICLES  
Filed Oct. 11, 1921
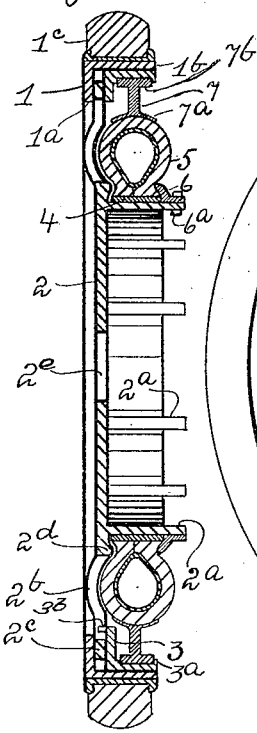
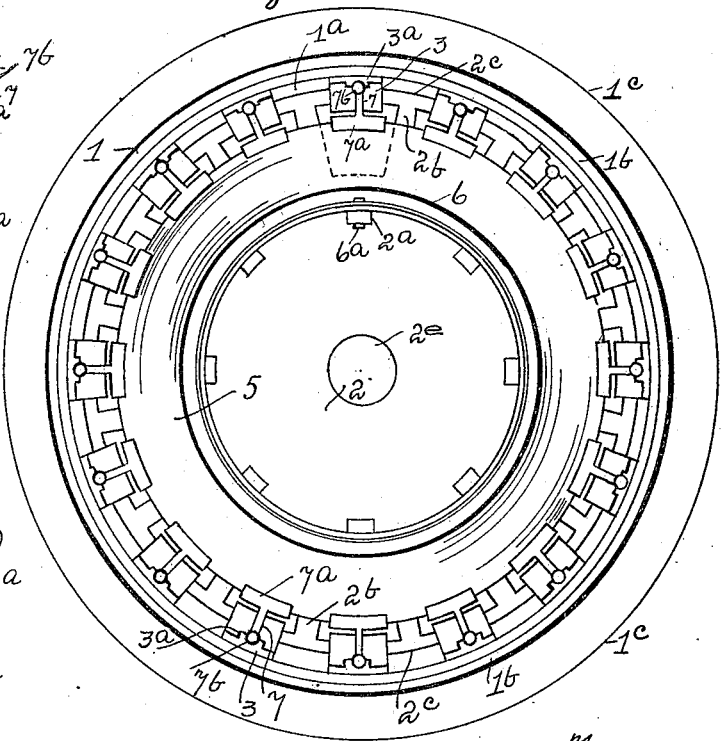
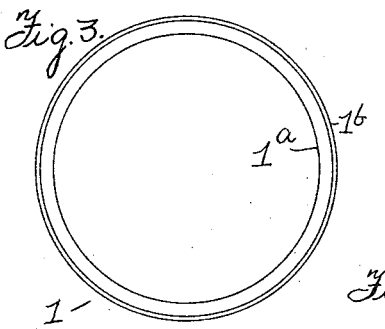
INVENTOR.  
Austin A. Mendenhall  
BY James T. Watson  
ATTORNEYS.

Patented Sept. 9, 1924.

1,508,231

UNITED STATES PATENT OFFICE.

AUSTIN A. MENDENHALL, OF DULUTH, MINNESOTA.

SHOCK-ABSORBING WHEEL FOR VEHICLES.

Application filed October 11, 1921. Serial No. 507,075.

*To all whom it may concern:*

Be it known that I, AUSTIN A. MENDENHALL, a citizen of the United States, residing at Duluth, in the county of St. Louis and State of Minnesota, have invented certain new and useful Improvements in Shock-Absorbing Wheels for Vehicles, of which I do hereby declare the following to be a specification.

My invention relates to shock absorbing wheels for vehicles and has for its object the provision of a wheel of improved structure of the type described, embodying an exterior or road-bearing tire, and an interior or hub tire. It consists of the structures, combinations and arrangements of parts hereinafter described and claimed.

In the drawings, Fig. 1, is a central vertical transverse section through a wheel embodying my said invention, Fig. 2 is an outer side elevation of said wheel, Fig. 3 is a reduced outer side elevation of the felloe of said wheel. Fig. 4 is a reduced outer side elevation of the hub member of said wheel, Fig. 5 is a perspective of a spacing spoke, and Fig. 6 is a perspective of a retaining lug, Fig. 7 is a modified form of said lug.

In the drawings, 1 is a felloe, preferably comprising a vertical web portion $1^a$ and a horizontal flange $1^b$ and preferably constructed of angle iron. Mounted on said felloe is a tire of any suitable structure or material, as a solid cushion tire $1^c$. Positioned loosely against the outer face of said web and spaced from said flange is a hub member concentric with said felloe and comprising a centrally apertured vertically directed disc portion 2, a horizontally directed inwardly extending plurality of fingers $2^a$, a series of radial spokes $2^b$, and a peripheral rim $2^c$. Said hub member is retained in parallel position with respect to said felloe, by means of a series of radial lugs 3, secured to the flange of said felloe and extending for a short distance loosely across the outer face of said rim, said rim extending into the space between the web of said felloe and said lugs. Formed on the outer face of said hub member, adjacent to the converging ends of said spokes, is a bead $2^d$, adapted to engage one of the beads upon the hereinafter described hub tire. Mounted upon said hub fingers $2^a$, is a rim 4, upon which is mounted a resilient tire 5 preferably of the standard pneumatic type, one bead of which is engaged by said hub member bead $2^d$, and the other bead of which is engaged by a clincher rim 6 which is mounted upon and secured in any suitable manner as by bolt $6^a$ to said hub fingers $2^a$, which clincher rim also serves to retain said rim 4 in position. If desired, said rim 4 may be omitted, and if desired a continuous flange may be substituted for said fingers for the support of said hub tire. It will be observed that said spokes $2^b$ are concave-convex or bowed to conform approximately to the contour of the opposing side of said tire 5.

Extending from the periphery of said hub tire to the opposing faces of said lugs 3, are radially directed removable spacing spokes, each comprising a broad curved base $7^a$ adapted to conform to the longitudinal and transverse curves of a corresponding area of the opposing hub tire, a web portion 7, and a transversely directed cylindrical head $7^b$, which head is adapted to bear in a socket $3^a$ formed in the base of the opposing felloe lug 3, said spacing spokes being adapted to rock slightly in their sockets in a direction parallel to the face of the wheel, and being adapted to fit firmly against said sockets and against said hub tire when said hub tire is inflated. If desired, fingers of any suitable structure, having a stationary relationship with respect to said felloe may be directed through the apertures between the hub spokes $2^b$ to limit the independent rotary movement of the hub member with respect to said felloe. Said fingers may, if desired, be formed on said lugs 3 as at $3^b$.

Said hub portion is centrally apertured as at $2^e$ and is adapted to fit upon the axle arm of the vehicle to be served.

In operation, the hub member is supported on said felloe member by means of said hub tire and removable spacing spokes, through which the load strains are transferred to the felloe. It will be observed that the hub member is adapted to play in a vertical plane in the space between the vertical web of the felloe and the adjacent retaining lugs, subject to control by said hub tire and spacing spokes. It is particularly noted that the hub member of my wheel is not bolted to the felloe member, and that rattling of the peripheral rim of the hub member against retaining bolts is therefore obviated.

It is obvious that said structure may be modified in various particulars within the scope of certain of my claims.

What I claim is:

1. In a wheel, the combination of a hub member and a felloe member, said felloe including a horizontal flange and a vertical web, a plurality of lugs extending from said flange parallel to said web and spaced therefrom, the periphery of said hub member extending loosely into the space between said lugs and said web, said hub member being normally spaced from said flange, said hub member being apertured near its periphery to permit the escape of dirt, said lugs having fingers formed thereon adapted to extend loosely through said apertures to limit the independent rotary movement of the hub member with relation to the felloe, and resilient means interposed between said hub and said lugs for yieldingly supporting said hub on said lugs.

2. In a wheel, the combination of a hub member having a resilient tire mounted thereon, of a concentric felloe spaced from said tire, a plurality of lugs attached to said felloe, said lugs having sockets formed therein, spokes interposed between said tire and said lugs, said spokes being adapted to rock in said sockets and to rest upon the crest of said tire, said lugs being adapted to loosely engage said hub member to limit the rotary movement of said hub member and of said felloe with respect to each other.

3. In a wheel, the combination of a felloe, said felloe having a horizontal flange and a vertical web, of a hub member concentric with said flange, the side of said hub member at its periphery overlapping said web and being spaced from said flange, separate means attached to said flange and overlapping the opposite side face of hub member at its periphery, said separate means having sockets formed therein, a resilient tire mounted on said hub member and a plurality of spokes interposed between said tire and said sockets, said spokes being adapted to rock in said sockets and to rest upon the crest of said tire.

4. In a wheel, the combination with an undivided felloe, said felloe having a horizontal flange and a vertical web, of a hub member concentric with said flange and spaced therefrom, the side of said hub member at its periphery overlapping said web, said hub member being transversely apertured near its periphery, separate means attached to said flange and overlapping the opposite side face of said hub at its periphery, means extending from said separate means through said aperture for limiting the rotary movement of said hub member and said felloe with respect to each other, and cushioning means interposed between said hub member and said felloe.

5. In a wheel, the combination with a felloe having a horizontal flange and a vertical web, of a hub member concentric with said flange and spaced therefrom, the side of said hub member at its periphery overlapping said web, a separate member attached to said flange and overlapping the opposite side face of said hub member, means extending from one of said members and adapted to loosely engage the other of said members to limit the rotary displacement of said members with respect to each other, and cushioning means interposed between said hub member and said felloe.

6. In a wheel, the combination of a felloe member including a horizontal flange, a hub member concentric with said flange and spaced therefrom, means depending from said flange and overlapping one side face of said hub member at the periphery thereof, separate means attached to said flange and overlapping the opposite side face of said hub member at the periphery thereof, and means extending from one of said overlapping means adapted to loosely engage said hub member to limit the rotary displacement of said felloe and said hub members with respect to each other, and cushioning means interposed between said hub member and said felloe member.

In testimony whereof, I hereunto affix my signature, in presence of two witnesses.

AUSTIN A. MENDENHALL.

Witnesses:
H. A. BERG,
E. M. MUNSON.